United States Patent [19]
Liang

[11] Patent Number: 5,850,996
[45] Date of Patent: Dec. 22, 1998

[54] MOBILE TELEPHONE HANGING DEVICE

[75] Inventor: Ying-Ping Liang, Taipei Hsien, Taiwan

[73] Assignee: Two Thousand and One Technology, Inc., Taipei, Taiwan

[21] Appl. No.: 611,492

[22] Filed: Mar. 5, 1996

[51] Int. Cl.⁶ .................................................. B65D 25/52
[52] U.S. Cl. ..................... 248/221.11; 224/197; 224/272; 24/3.5
[58] Field of Search .......................... 248/221.11, 220.21, 248/223.41; 224/271, 272, 197, 674, 675, 930; 24/3.1, 3.5, 3.11, 615

[56] References Cited

U.S. PATENT DOCUMENTS

| | | | |
|---|---|---|---|
| 4,419,794 | 12/1983 | Horton, Jr. et al. | 224/197 X |
| 4,897,900 | 2/1990 | Baggett | 24/3.5 X |
| 5,014,892 | 5/1991 | Copeland | 224/271 |
| 5,054,170 | 10/1991 | Otrusina | 224/197 X |
| 5,375,749 | 12/1994 | Oliva | 224/272 X |
| 5,584,423 | 12/1996 | Wang | 224/197 |
| 5,597,102 | 1/1997 | Saarikko et al. | 224/197 |

*Primary Examiner*—Alvin C. Chin-Shue
*Assistant Examiner*—Long Dinh Phan
*Attorney, Agent, or Firm*—Bacon & Thomas

[57] ABSTRACT

A mobile telephone hanging device which includes a base plate, a clamping plate hinged to the base plate for fastening it to the user's belt, a hanging plate fixedly secured to the mobile telephone and having a grooved hanging rod for fastening to the base plate, the base plate having a smoothly curved rib for hanging the hanging rod of the hanging plate and an elongated movable plate for stopping the hanging rod of the hanging plate in the engaged position, and two push rods controlled to release the elongated movable plate from the hanging rod of the hanging plate for permitting the hanging plate to be disconnected from the base plate.

7 Claims, 3 Drawing Sheets

MOBILE TELEPHONE HANGING DEVICE

BACKGROUND OF THE INVENTION

The present invention relates to hanging devices, and relates more particularly to a mobile telephone hanging device which can be conveniently and detachably fastened to the belt to hold a mobile telephone.

Mobile telephones have become more and more popular nowadays. When a mobile telephone is used, it may be held in the hand or put in the pocket. However, a user tends to put the mobile telephone in a nearby place and may forget to pick up the mobile telephone after an use.

SUMMARY OF THE INVENTION

The present invention overcomes the aforementioned problem. It is the main object of the present invention to provide a mobile telephone hanging device which can be conveniently fastened to the belt of a user to hold a mobile telephone. According to the preferred embodiment of the present invention, the mobile telephone hanging device comprises a base plate, a clamping plate hinged to the base plate for fastening it to the user's belt, a hanging plate fixedly secured to the mobile telephone and having a grooved hanging rod for fastening to the base plate, the base plate having a smoothly curved rib for hanging the hanging rod of the hanging plate and an elongated movable plate for stopping the hanging rod of the hanging plate in the engaged position, and two push rods controlled to release the elongated movable plate from the hanging rod of the hanging plate for permitting the hanging plate to be disconnected from the base plate.

DETAILED DESCRIPTION OF THE PREFERRED EMBODIMENT

Figure 1:
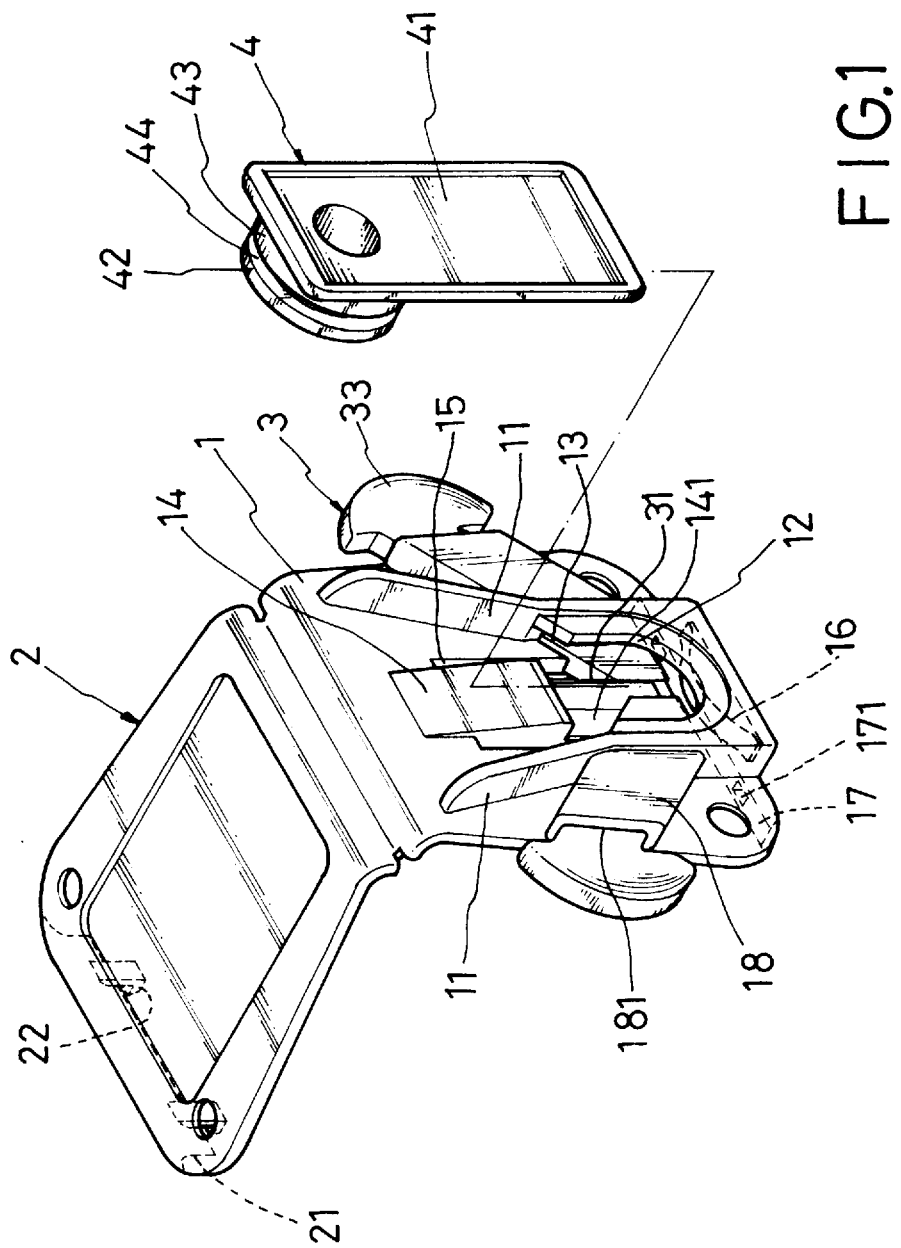
FIG. 1 is a perspective view of a mobile telephone hanging device according to the present invention.
Figure 2:
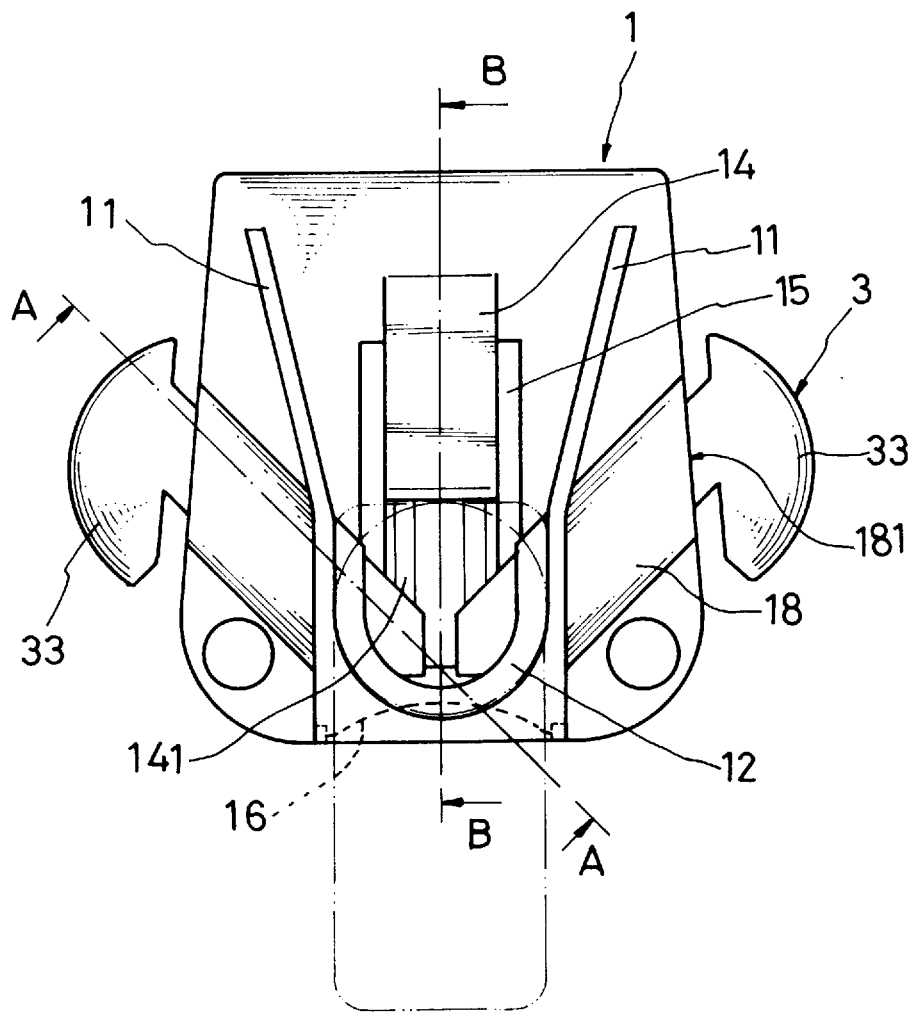
FIG. 2 is a front view of the mobile telephone hanging device shown in FIG. 1.
Figure 4:
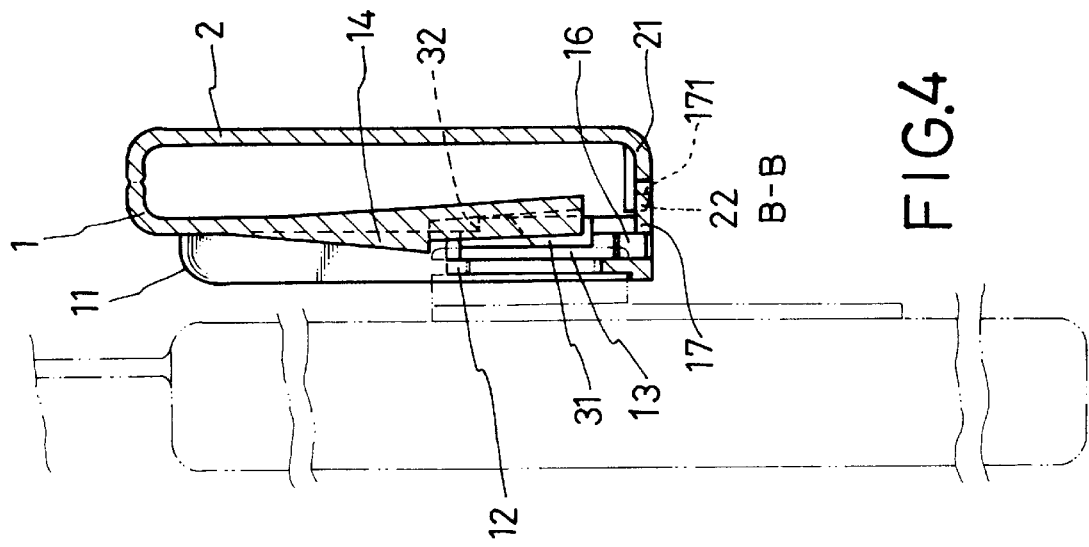
FIG. 4 is a sectional view taken along line B—B of FIG. 2.
Figure 3:
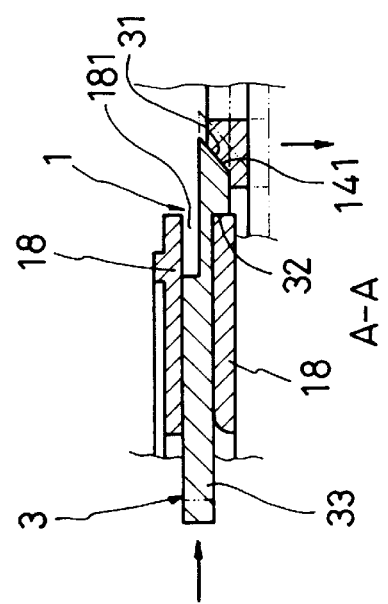
FIG. 3 is a sectional view taken along line A—A of FIG. 2.

Referring to FIGS. 1, 2, 3, and 4, a mobile telephone hanging device in accordance with the present invention is generally comprised of a base plate 1, a clamping plate 2, two push rods 3, and a hanging plate 4.

The base plate 1 and clamping plate 2 are integrally formed from plastic. The base plate 1 includes two symmetrical bevel ribs 11 raised from the front side, a smoothly curved connecting rib 12 connected between the bevel ribs 11 in parallel to the front side of the base plate 1 and defining with the front side of the base plate 1 a receiving chamber 13, an opening 15 in the middle between the bevel ribs 11, an elongated movable plate 14 hinged to the periphery of the opening 15 and projecting downward toward the receiving chamber 13, two extension strips 141 respectively extending from the bottom end of the elongated movable plate 14 and sloping outwardly downwards and projecting into the receiving chamber 13, an upwardly arched rib 16 disposed in the receiving chamber 13 and spaced between the front side of the base plate 1 and the back side of the smoothly curved connecting rib 12, two bottom lugs 17 bilaterally disposed at the bottom side, each lug 17 having a respective pin hole 171, and two sloping push rod holder portions 18 symmetrically disposed at two opposite sides and defining a respective receiving hole 181 for holding the push rods 3. The clamping plate 2 is integrally formed with and hinged to the base plate 1, and having an upright stop wall 21 raised from the bottom side thereof, and two plug pins 22 bilaterally disposed adjacent to the upright stop wall 21 for fitting into the pin holes 171 of the bottom lugs 17. The push rods 3 are respectively inserted into the receiving holes 181 of the sloping push rod holder portions 18, each rod 3 having a wider handle 33 at one end for pushing by hand, a stop edge 32 in the middle engaged with the periphery of the opening 15, and a beveled tip 31 at an opposite end stopped against one of the extension strips 141. The hanging plate 4 comprises a mounting board 41 fixedly adhered to the mobile telephone, a rounded hanging rod 42 raised from the mounting board 41, and an annular groove 44 around the periphery 43 of the rounded hanging rod 42.

When in use, the base plate 1 and the clamping plate 2 are hung on the belt and fastened together by fitting the plug pins 22 of the clamping plate 2 into the pin holes 171 of the lugs 17 of the base plate 1, then the hanging plate 4 is fastened to the base plate 1 by inserting the rounded hanging rod 42 into the receiving chamber 13 and forcing the annular groove 44 into engagement with the smoothly curved connecting rib 12. When installed, the rounded hanging rod 42 is stopped between the upwardly arched rib 16 and the elongated movable plate 14 and supported on the extension strips 141, and allowed to be turned relative to the smoothly curved connecting rib 12. Therefore, when the user bends the body, the hanging plate 4 with the mobile telephone can be moved relative to the base plate 1 to fit the movement of the body.

When using the mobile telephone, the hanging plate 4 can be conveniently disconnected from the base plate 1 by pushing the push rods 3 inwards to pull extension strips 141 downwards. When the extension strips 141 are pulled downwards by the push rods 3, the elongated movable plate 14 is turned backwards toward the opening 15, and the arched rib 16 is returned to its former shape to push the rounded hanging rod 42 upwards, causing the rounded hanging rod 42 to disengage from the elongated movable plate 14, and therefore the hanging plate 4 can be conveniently removed from the base plate 1.

While only one embodiment of the present invention has been shown and described, it will be understood that various modifications and changes may be made without departing from the scope and spirit of the invention disclosed. For example, adhesion means may be provided on the back side of the clamping plate 2 so that the clamping plate 2 can be fastened to a wall or the like.

What the invention claimed is:

1. A mobile telephone hanging device comprising:
    an integrally formed base plate, said base plate comprising a front side, two symmetrical bevel ribs raised from said front side, a smoothly curved connecting rib connected between said bevel ribs in parallel to said front side and defining with said front side a receiving chamber receiving a rounded hanging rod of a mobile telephone permitting the rounded hanging rod of the mobile telephone to be forced into engagement with said smoothly curved connecting rib, an opening in the middle between said bevel ribs, an elongated movable plate hinged to the periphery of said opening and projecting downward toward said receiving chamber stopping the rounded hanging rod of the mobile telephone into engagement with said smoothly curved connecting rib, two extension strips respectively extending from said elongated movable plate and sloping downwardly outwards and projecting into said receiving chamber, an upwardly arched rib disposed in said receiving chamber and spaced between said front side and said smoothly curved connecting rib supporting the rounded hanging rod of the mobile telephone in said receiving chamber, two bottom lugs bilaterally disposed at a bottom side thereof and defining a respective pin hole, and two sloping push rod holder portions symmetrically disposed at two opposite sides and defining a respective receiving hole;

a clamping plate having a top side connected to said base plate, a bottom side terminating in an upright stop wall, and two plug pins bilaterally disposed adjacent to said upright stop wall for fitting into the pin holes of the bottom lugs of said base plate to secure said base plate to the user's belt; and two push rods respectively inserted into the receiving holes of the sloping push rod holder portions of said base plate, each of said push rods having a handle at an outer end thereof for pushing by hand, a stop edge in the middle engaged with the periphery of the opening of said base plate, and a beveled tip at an inner end stopped against one of the extension strips of said base plate, said push rods pulling said extension strips downwards to move said elongated movable plate toward said opening permitting the rounded hanging rod of the mobile telephone to be disconnected from said base plate, when they are respectively pushed inwards.

2. The mobile telephone hanging device of claim 1 wherein said base plate and said clamping plate are connected together by a hinge.

3. The mobile telephone hanging device of claim 1 wherein said base plate and said clamping plate are integrally molded from plastic.

4. The mobile telephone hanging device of claim 1 further comprising a hanging plate fixedly fastened to the mobile telephone for fastening to said base plate, said hanging plate including a mounting board for fastening to the mobile telephone, the hanging rod raised from said mounting board for insertion into the receiving chamber of said base plate to be stopped between the arched rib and elongated movable plate of said base plate, and an annular groove around said hanging rod for engagement with the smoothly curved connecting rib of said base plate.

5. The mobile telephone hanging device of claim 4 wherein said hanging rod of said hanging plate has a rounded profile.

6. The mobile telephone hanging device of claim 1 wherein the handle of each of said push rods has an arched profile of greater width than the width of the respective push rod.

7. The mobile telephone hanging device of claim 1 wherein said clamping plate has adhesion means at a back side thereof opposite to said upright stop wall for fastening.

* * * * *